US012345463B2

(12) United States Patent
Li

(10) Patent No.: US 12,345,463 B2
(45) Date of Patent: Jul. 1, 2025

(54) GLASS DOOR AND WINE COOLER

(71) Applicants: Zhongshan Yuegao E-commerce Co., Ltd, Zhongshan (CN); ZHONGSHAN CANDOR ELECTRIC APPLIANCES CO., LTD., Zhongshan (CN)

(72) Inventor: Xiong Li, Zhongshan (CN)

(73) Assignees: Zhongshan Yuegao E-commerce Co., Ltd, Zhongshan (CN); ZHONGSHAN CANDOR ELECTRIC APPLIANCES CO., LTD., Zhongshan (CN)

( * ) Notice: Subject to any disclaimer, the term of this patent is extended or adjusted under 35 U.S.C. 154(b) by 291 days.

(21) Appl. No.: 17/981,910

(22) Filed: Nov. 7, 2022

(65) Prior Publication Data

US 2023/0152027 A1 May 18, 2023

(30) Foreign Application Priority Data

Nov. 8, 2021 (CN) ......................... 202122716902.3

(51) Int. Cl.

| | |
|---|---|
| ***F25D 23/02*** | (2006.01) |
| ***A47F 3/04*** | (2006.01) |
| ***E06B 3/24*** | (2006.01) |
| ***F25D 31/00*** | (2006.01) |

(52) U.S. Cl.
CPC ............ *F25D 23/02* (2013.01); *A47F 3/0434* (2013.01); *E06B 3/24* (2013.01); *F25D 31/007* (2013.01); *F25D 2323/024* (2013.01); *F25D 2331/803* (2013.01)

(58) Field of Classification Search
CPC ...... F25D 23/02; F25D 2323/024; E06B 3/24; A47F 3/043; A47F 3/0434
See application file for complete search history.

(56) References Cited

U.S. PATENT DOCUMENTS 3,411,247 A * 11/1968 Fleming .............. E06B 3/26347 52/786.13
3,629,972 A * 12/1971 Rehberg .................. E05F 1/123 49/386

(Continued)

FOREIGN PATENT DOCUMENTS

CN 105806022 A * 7/2016
CN 110440510 A * 11/2019

(Continued)

*Primary Examiner* — Andrew Roersma

(57) ABSTRACT

A glass door includes a glass assembly, a door frame, a decoration element and a door sealing element. The glass assembly includes a front glass having four outer side surfaces connected with each other end to end. The door frame surrounds the front glass and includes four inner side surfaces connected with each other end to end, a first surface connected with the inner side surfaces, and a second surface opposite to the first surface and connected with the inner side surfaces. The decoration element includes a first decoration sheet and four second decoration sheets vertically connected with the first decoration sheet and formed by vertically bending. The first decoration sheet covers a periphery region of a front surface of the front glass, and the second decoration sheets cover the four outer side surfaces of the front glass respectively. The door sealing element covers the second surface.

20 Claims, 4 Drawing Sheets

(56) References Cited

U.S. PATENT DOCUMENTS

| | | | | | |
|---|---|---|---|---|---|
| 4,741,127 | A * | 5/1988 | Bockwinkel | E06B 3/26341 52/786.13 |
| 4,948,206 | A * | 8/1990 | Fitzpatrick | A47F 3/043 312/405 |
| 5,048,233 | A * | 9/1991 | Gidseg | F25D 23/02 49/501 |
| 5,111,618 | A * | 5/1992 | Kaspar | E06B 3/5427 49/504 |
| 5,214,877 | A * | 6/1993 | Kaspar | F25D 17/047 49/70 |
| 5,255,473 | A * | 10/1993 | Kaspar | A47F 3/043 49/504 |
| 8,776,443 | B2 * | 7/2014 | Bienick | E05D 7/1011 49/504 |
| 2002/0078654 | A1 * | 6/2002 | Richardson | A47F 3/125 49/504 |
| 2004/0163323 | A1 * | 8/2004 | Herrmann | A47F 3/0434 49/501 |
| 2006/0273700 | A1 * | 12/2006 | Gornoll | F25D 23/02 312/116 |
| 2022/0408941 | A1 * | 12/2022 | Hwang | F25D 23/028 |

FOREIGN PATENT DOCUMENTS

| | | | | |
|---|---|---|---|---|
| DE | 102010033305 | A1 * | 2/2012 | A47F 3/0434 |
| KR | 20190113410 | A * | 10/2019 | |

* cited by examiner

GLASS DOOR AND WINE COOLER

CROSS-REFERENCE TO RELATED APPLICATIONS

The application claims priority of Chinese patent application CN202122716902.3, filed on Nov. 8, 2022, which is incorporated herein by reference in its entireties.

TECHNICAL FIELD

The present disclosure relates to the technical field of refrigerating device, specifically relates to a glass door and a wine cooler.

BACKGROUND

At present, all kinds of wine coolers sold in the market are mainly composed of a cabinet body with a refrigeration system and a glass door connected with the cabinet body. The glass door may include a door frame with an embedded groove and a glass body installed in the embedded groove.

However, how to make the glass door with a beautiful and tidy appearance is an important problem.

SUcentimeterARY

The present disclosure provides a glass door and a wine cooler, so as to improve visual effect of the whole glass door which has the advantages of a compact structure and beautiful and tidy appearance.

The present disclosure adopts the following technical solution: a glass door including a glass assembly comprising a front glass, the front glass comprising four outer side surfaces connected with each other end to end; a door frame surrounding the front glass and comprising four inner side surfaces connected with each other end to end, a first surface connected with the inner side surfaces, and a second surface opposite to the first surface and connected with the inner side surfaces; a decoration element comprising a first decoration sheet and four second decoration sheets vertically connected with the first decoration sheet and formed by vertically bending, the first decoration sheet covering a periphery region of a front surface of the front glass, and the second decoration sheets covering the four outer side surfaces of the front glass respectively, an outer surface of the second decoration sheet flush with an outer side surface of the door frame; and a door sealing element covering the second surface.

Further, the four second decoration sheets and the first decoration sheet are integrally connected or prefabricated integrally.

Further, the decoration element is a stainless steel sheet.

Further, the first decoration sheet comprises four decoration strips connected with each other end to end, a width of each decoration strip is greater than 4 centimeter.

Further, the width of different decoration strips are the same or different.

Further, the glass assembly further comprises a rear glass, and the rear glass is supported by the inner side surfaces.

Further, the rear glass comprises double glazing.

Further, a joint part of the front glass and the door frame is provided with a sealing glue.

Further, the glass door further comprises a handle, the handle is arranged on the decoration element.

Further, an outer surface of the second decoration sheet is flush to an outer side surface of the door frame.

The present disclosure adopts the following technical solution: a wine cooler including a cabinet body, a door hinge; and a glass door comprising a glass assembly, a door frame, a decoration element and a door sealing element, the glass assembly comprising a front glass, the front glass comprising four outer side surfaces connected with each other end to end; the door frame surrounding the front glass and comprising four inner side surfaces connected with each other end to end, a first surface connected with the inner side surfaces, and a second surface opposite to the first surface and connected with the inner side surfaces; the decoration element comprising a first decoration sheet and four second decoration sheets vertically connected with the first decoration sheet and formed by vertically bending, the first decoration sheet covering a periphery region of a front surface of the front glass, and the second decoration sheets covering the four outer side surfaces of the front glass respectively; and the door sealing element covering the second surface, an outer surface of the second decoration sheet flush with an outer side surface of the door frame, wherein the door frame is rotatably connected with the cabinet body through the door hinge.

Further, the door frame comprises a hole, the door hinge comprises a shaft and a fixing element connected with the cabinet body, an end of the shaft is connected the fixing element, the other end of the shaft is inserted into the hole so as to rotately connect with the door frame.

Further, the four second decoration sheets and the first decoration sheet are integrally connected or prefabricated integrally.

Further, the decoration element is a stainless steel sheet.

Further, the first decoration sheet comprises four decoration strips connected with each other end to end, a width of each decoration strip is greater than 4 centimeter.

Further, the glass assembly further comprises a rear glass, and the rear glass is supported by the inner side surfaces.

Further, the rear glass comprises double glazing.

Further, a joint part of the rear glass and the door frame is provided with a sealing glue.

Further, a joint part of the front glass and the door frame is provided with a sealing glue.

Further, the glass door further comprises a handle, the handle is arranged on the decoration element.

The present disclosure has the beneficial effects: the first decoration sheet covers a periphery region of a front surface of the front glass, and the second decoration sheets cover the four outer side surfaces of the front glass respectively, the four second decoration sheets are vertically connected with the first decoration sheet and formed by vertically bending, an outer surface of the second decoration sheet is flush with an outer side surface of the door frame, such that the glass door forms good visual effect and has the advantages of a compact structure and beautiful and tidy appearance.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
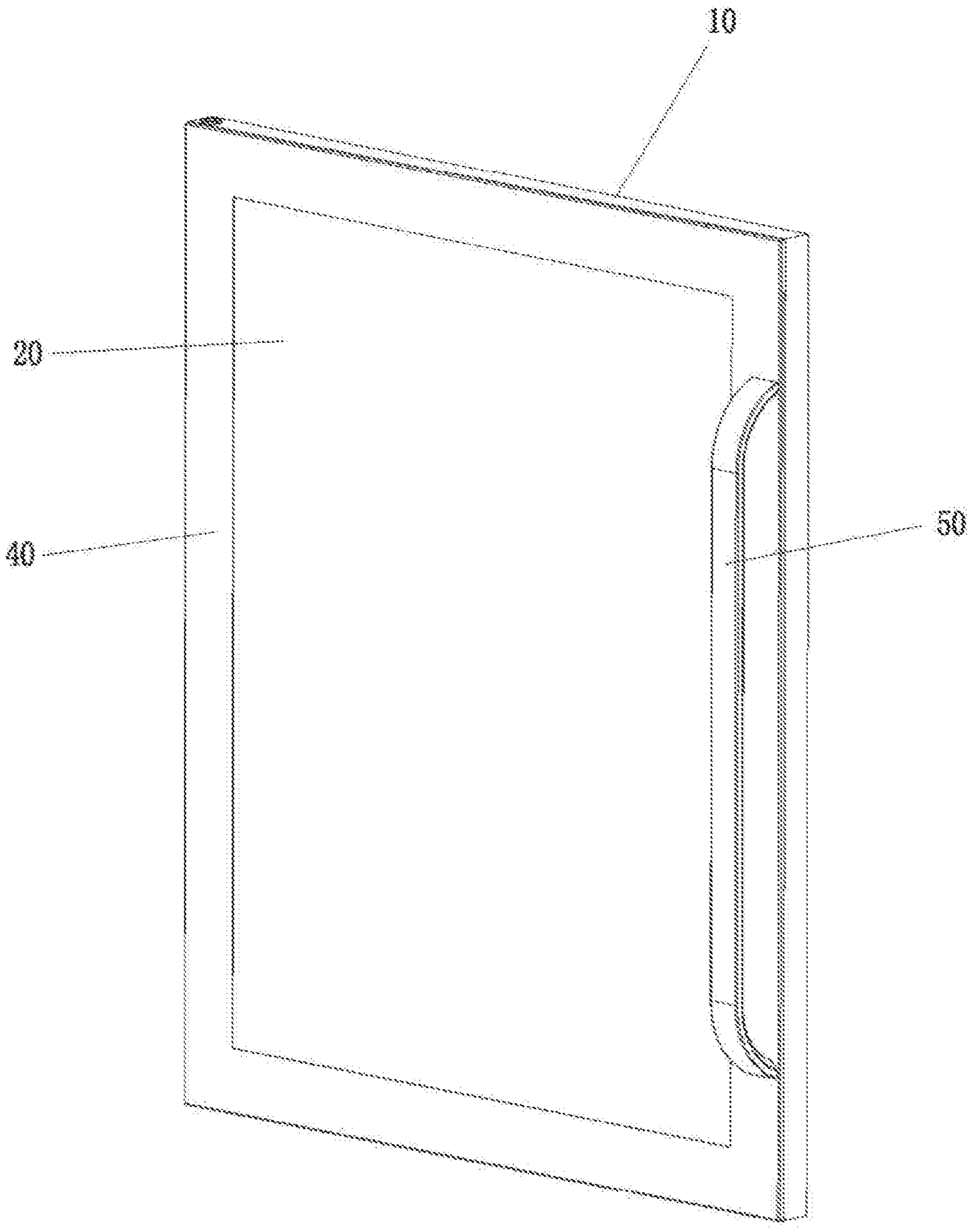
FIG. 1 is a schematic diagram of a glass door according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 2:
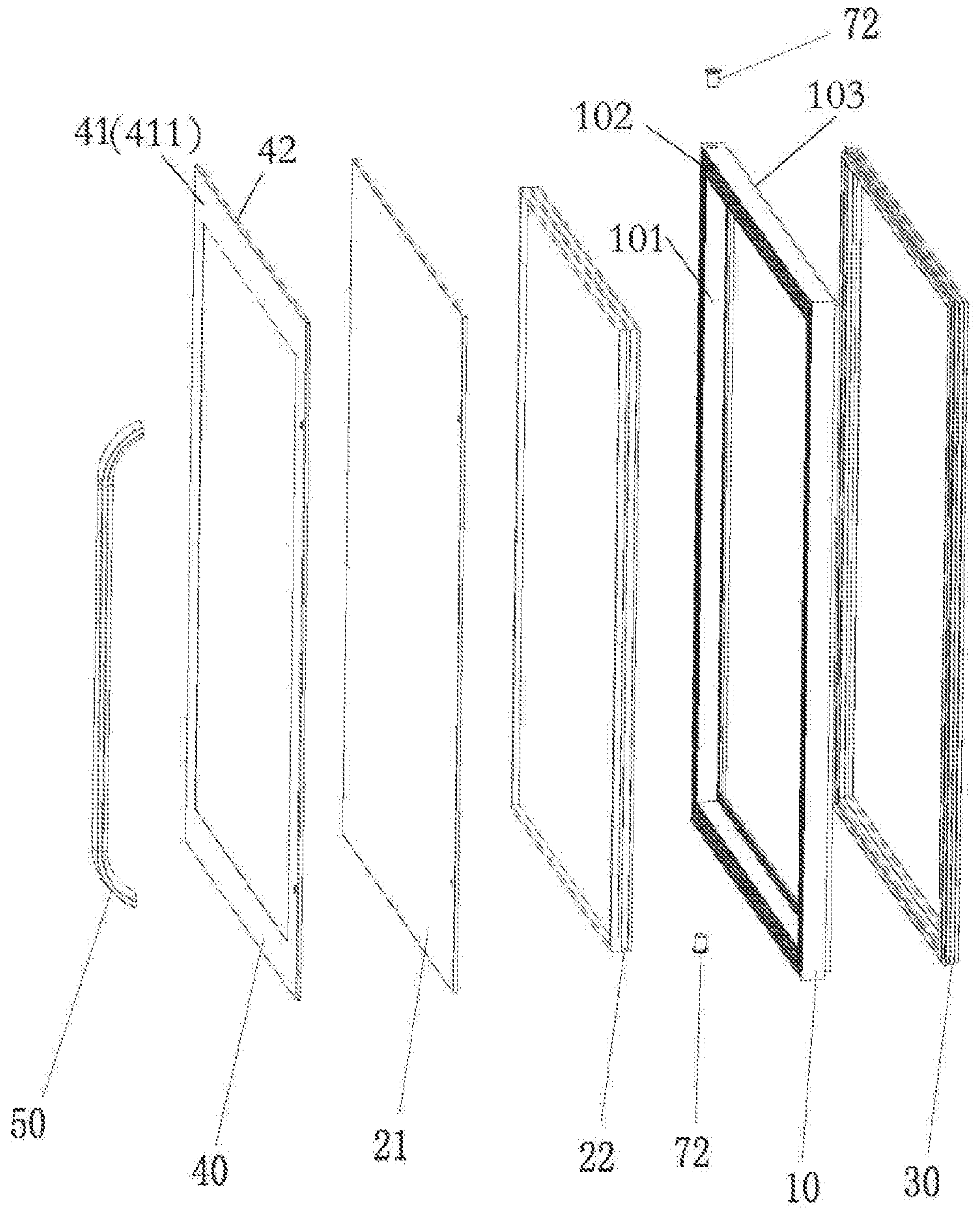
FIG. 2 is an exploded diagram of the glass door according to an embodiment of the present disclosure.
Figure 3:
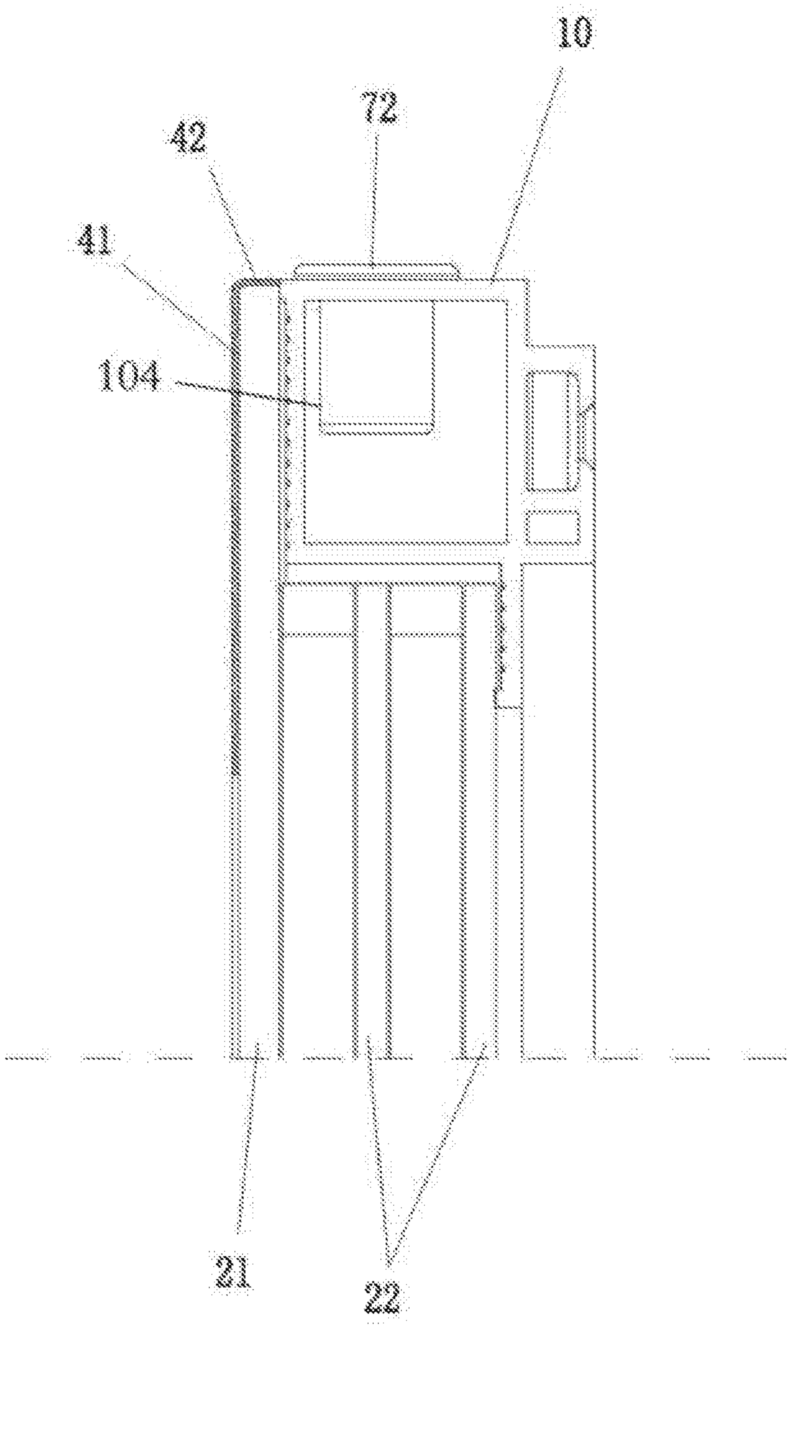
FIG. 3 is a cross section diagram of the glass door according to an embodiment of the present disclosure.

Referring to FIG. 1 to FIG. 3, a glass door according to the present disclosure includes a door frame 10, a glass assembly 20, a door sealing element 30, a decoration element 40 and a handle 50.

The glass assembly 20 includes a front glass 21 and a rear glass 22. The front glass 21 includes four outer side surfaces connected with each other end to end. The rear glass 22 is double glazing.

The door frame 10 surrounds the front glass 21 and includes four inner side surfaces 101 connected with each other end to end, a first surface 102 connected with the inner side surfaces 101, and a second surface 103 opposite to the first surface 102 and connected with the inner side surfaces 101. The rear glass 22 is supported by the inner side surfaces 101. The first glass 21 covers the first surface 102. The door sealing element 30 covers the second surface 103.

A joint part of the front glass 21 and the door frame 10 and a joint part of the rear glass 2*w* and the door frame 10 are provided with a sealing glue.

The decoration element 40 can be a stainless steel sheet and includes a first decoration sheet 41 and four second decoration sheets 42 vertically connected with the first decoration sheet 41 and formed by vertically bending. The four second decoration sheets 42 and the first decoration sheet 41 are integrally connected or prefabricated integrally.

The first decoration sheet 41 covers a periphery region of a front surface 102 of the front glass 21, and the second decoration sheets 42 covering the four outer side surfaces of the front glass 21 respectively. An outer surface of the second decoration sheet 42 is flush with an outer side surface of the door frame 10.

The handle 50 is arranged on the first decoration sheet 41 of the decoration element 40. In one embodiment, the handle 50 can be fixed on the first decoration sheet 41 by screw.

The door sealing element 30 covers the second surface 102 and configured to provide sealing connection.

The first decoration sheet 41 comprises four decoration strips 411 connected with each other end to end, a width W1 of each decoration strip 411 is greater than 4 centimeter (such as 5 centimeter), and the width of different decoration strips are the same or different.

The present disclosure has the beneficial effects: the first decoration sheet 41 covers a periphery region of a front surface of the front glass 21, the four second decoration sheets 42 cover the four outer side surfaces of the front glass 21 respectively, the four second decoration sheets 42 are vertically connected with the first decoration sheet 41 and formed by vertically bending, an outer surface of the second decoration sheet 42 is flush with an outer side surface of the door frame 10, such that the glass door 10 forms good visual effect and has the advantages of a compact structure and beautiful and tidy appearance.

Figure 4:
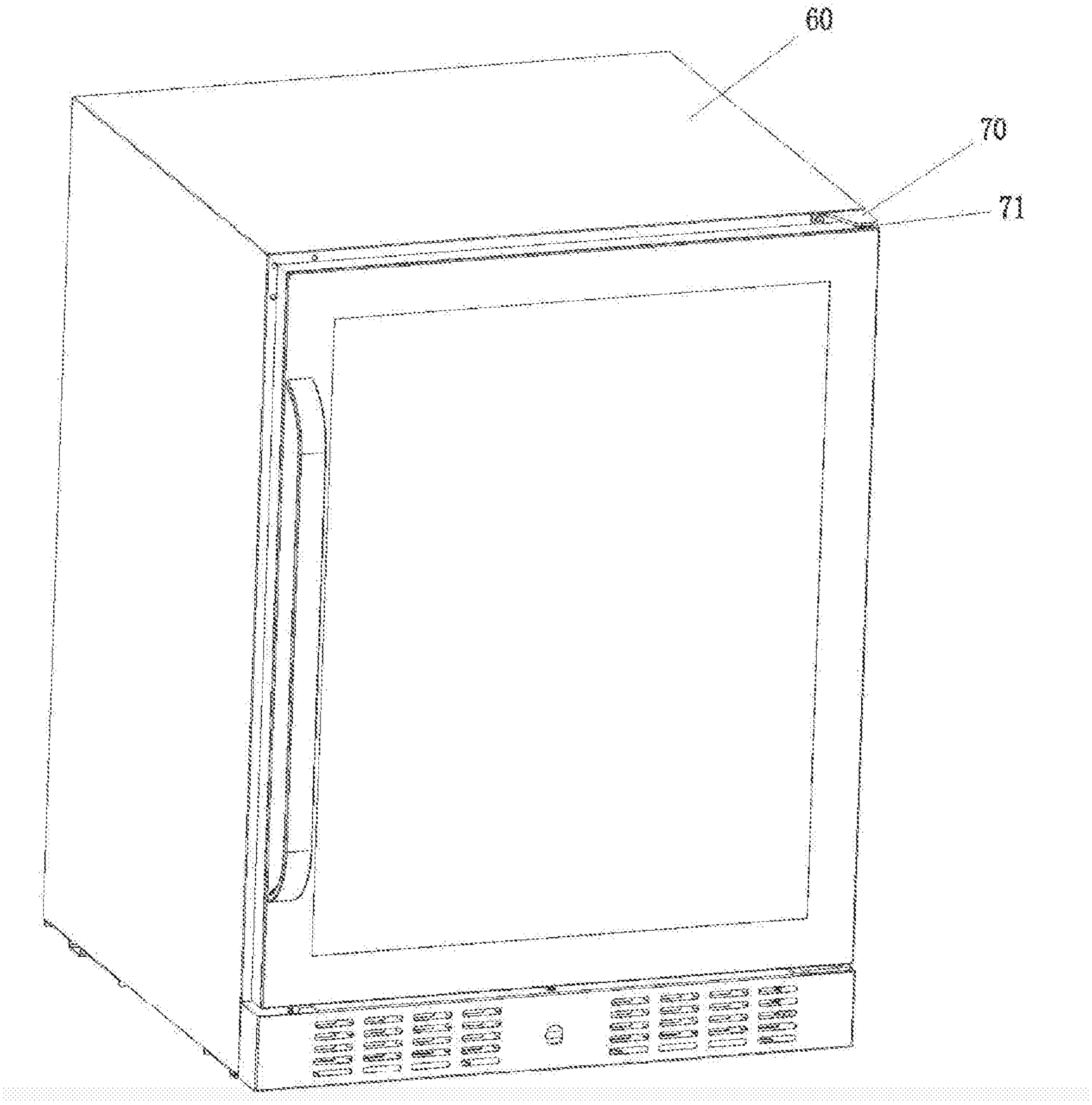
FIG. 4 is a schematic diagram of a wine cooler according to an embodiment of the present disclosure.

Referring to FIG. 2 to FIG. 4, a wine cooler includes a cabinet body 60, the glass door of FIG. 1 and a door hinge 70. The door frame 10 is rotatably connected with the cabinet body 60 through the door hinge 70.

The door frame 10 includes a hole 104. The door hinge 70 includes a shaft 71 and a fixing element 72 connected with the cabinet body 60. An end of the shaft 71 is connected the fixing element 72, the other end of the shaft 72 is inserted into the hole 104 so as to rotately connect with the door frame 10.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A glass door, comprising:

a glass assembly comprising a front glass, the front glass comprising four outer side surfaces connected with each other end to end;

a door frame surrounding the front glass and comprising four inner side surfaces connected with each other end to end, a first surface connected with the inner side surfaces, and a second surface opposite to the first surface and connected with the inner side surfaces;

a decoration element comprising a first decoration sheet and four second decoration sheets vertically connected with the first decoration sheet and formed by vertically bending, wherein the decoration element only covers the front glass in a manner that the first decoration sheet covers a periphery region of a front surface of the front glass, and the second decoration sheets covers the four outer side surfaces of the front glass respectively, an outer surface of the second decoration sheet is flush with an outer side surface of the door frame; and a door sealing element covering the second surface.

2. The glass door according to claim 1, wherein the four second decoration sheets and the first decoration sheet are integrally connected or prefabricated integrally.

3. The glass door according to claim 1, wherein the decoration element is a stainless steel sheet.

4. The glass door according to claim 1, wherein the first decoration sheet comprises four decoration strips connected with each other end to end, a width of each of the decoration strips is greater than 4 millimeter.

5. The glass door according to claim 4, wherein the width of each of the decoration strips are the same or different.

6. The glass door according to claim 1, wherein the glass assembly further comprises a rear glass, and the rear glass is supported by the inner side surfaces.

7. The glass door according to claim 6, wherein the rear glass comprises double glazing.

8. The glass door according to claim 1, wherein a joint part of the front glass and the door frame is provided with a sealing glue.

9. The glass door according to claim 1, wherein the glass door further comprises a handle, the handle is arranged on the decoration element.

10. The glass door according to claim 1, wherein an outer surface of the second decoration sheet is flush to an outer side surface of the door frame.

11. A wine cabinet, comprising a cabinet body;

a door hinge; and a glass door comprising a glass assembly, a door frame, a decoration element and a door sealing element, the glass assembly comprising a front glass, the front glass comprising four outer side surfaces connected with each other end to end; the door frame surrounding the front glass and comprising four inner side surfaces connected with each other end to end, a first surface connected with the inner side surfaces, and a second surface opposite to the first surface and connected with the inner side surfaces; the decoration element comprising a first decoration sheet and four second decoration sheets vertically connected with the first decoration sheet and formed by vertically bending, wherein the decoration element only covers the front glass in a manner that the first decoration sheet covers a periphery region of a front surface of the front glass, and the second decoration sheets covers the four outer side surfaces of the front glass respectively; and the door sealing element covers the second surface, an outer surface of the second decoration sheet is flush with an outer side surface of the door frame, wherein the door frame is rotatably connected with the cabinet body through the door hinge.

12. The wine cabinet according to claim 11, wherein the door frame comprises a hole, the door hinge comprises a shaft and a fixing element connected with the cabinet body, an end of the shaft is connected the fixing element, the other end of the shaft is inserted into the hole so as to rotatably connect with the door frame.

13. The wine cabinet according to claim 11, wherein the four second decoration sheets and the first decoration sheet are integrally connected or prefabricated integrally.

14. The wine cabinet according to claim 11, wherein the decoration element is a stainless steel sheet.

15. The wine cabinet according to claim 11, wherein the first decoration sheet comprises four decoration strips connected with each other end to end, a width of each of the decoration strips is greater than 4 millimeter.

16. The wine cabinet according to claim 11, wherein the glass assembly further comprises a rear glass, and the rear glass is supported by the inner side surfaces.

17. The wine cabinet according to claim 16, wherein the rear glass comprises double glazing.

18. The wine cabinet according to claim 16, wherein a joint part of the rear glass and the door frame is provided with a sealing glue.

19. The wine cabinet according to claim 11, wherein a joint part of the front glass and the door frame is provided with a sealing glue.

20. The wine cabinet according to claim 11, wherein the glass door further comprises a handle, the handle is arranged on the decoration element.

* * * * *